(12) United States Patent
Bassett (10) Patent No.: US 11,230,367 B2
(45) Date of Patent: Jan. 25, 2022

(54) BACKSTOP FOR AIRCRAFT STEERING SYSTEMS

(71) Applicant: Liebherr-Aerospace Lindenberg GmbH, Lindenberg/Allgaeu (DE)

(72) Inventor: Frederick Bassett, Scheidegg (DE)

(73) Assignee: Liebherr-Aerospace Lindenberg GmbH, Lindenberg (DE)

( * ) Notice: Subject to any disclaimer, the term of this patent is extended or adjusted under 35 U.S.C. 154(b) by 118 days.

(21) Appl. No.: 16/885,700

(22) Filed: May 28, 2020

(65) Prior Publication Data

US 2020/0377196 A1 Dec. 3, 2020

(51) Int. Cl.
  *B64C 13/28* (2006.01)
  *F16C 19/04* (2006.01)
  *F16D 63/00* (2006.01)

(52) U.S. Cl.
  CPC .............. *B64C 13/28* (2013.01); *F16C 19/04* (2013.01); *F16D 63/006* (2013.01)

(58) Field of Classification Search
  CPC ................................ B64C 13/28; F16D 41/12
  See application file for complete search history.

(56) References Cited

U.S. PATENT DOCUMENTS

| | | | | |
|---|---|---|---|---|
| 4,480,733 A | * | 11/1984 | Grimm | F16D 41/16 192/223.3 |
| 4,842,109 A | * | 6/1989 | Avny | B66D 1/14 188/82.77 |
| 5,582,390 A | * | 12/1996 | Russ | B64C 13/28 244/99.2 |
| 6,109,415 A | * | 8/2000 | Morgan | B64C 13/28 192/223.1 |
| 9,863,515 B2 | * | 1/2018 | Bernard | F16H 25/2454 |

FOREIGN PATENT DOCUMENTS

DE 69914666 T2 4/1999

* cited by examiner

*Primary Examiner* — Richard G Davis
(74) *Attorney, Agent, or Firm* — Imperium Patent Works (57) ABSTRACT

A backstop of a torque transmission device of an aircraft steering system includes input and output sections of a drive shaft. Torque is transmitted from the input to the output, but is prevented from being transferred from the output back into the input. The input is limited from rotating coaxially relative to the output by more than a predetermined angle. The input stops at a first rotary position relative to the output upon rotating in a first rotary direction. The input stops at a second rotary position upon rotating in the opposite direction. The output is blocked from rotating in the second direction while the input is at the first rotary position and is blocked from rotating in the first direction while the input is at the second rotary position. The output is blocked from rotating by dissipating any torque acting upon the output into the housing of the backstop.

19 Claims, 5 Drawing Sheets

BACKSTOP FOR AIRCRAFT STEERING SYSTEMS

CROSS REFERENCE TO RELATED APPLICATION

This application is based on and hereby claims the benefit under 35 U.S.C. § 119 from German Patent Application No. DE 102019114479.5, filed on May 29, 2019, in the German Patent Office. This application is a continuation-in-part of German Patent Application No. DE 102019114479.5, the contents of which are incorporated herein by reference.

TECHNICAL FIELD

The invention relates to a backstop for a torque transmission device in a steering system of an aircraft that prevents the external forces acting on steering flaps from being introduced into a drive shaft of the steering system.

BACKGROUND

Figure 1:
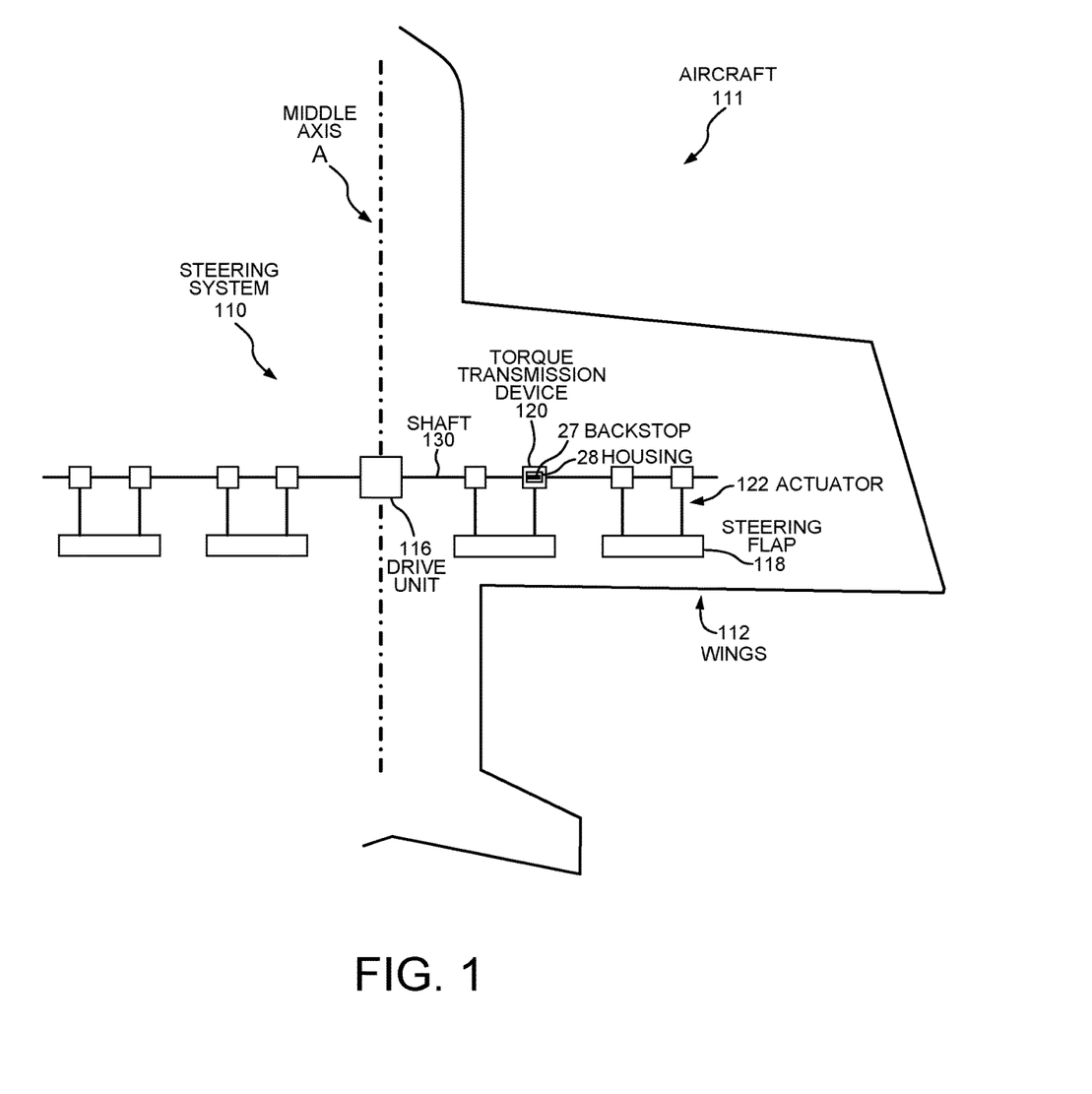
FIG. 1 shows a schematic overview representation of a steering system for steering flaps of an aircraft.

In airplanes, steering flaps such as landing flaps or thrust reverser flaps typically are actuated by means of a steering system that can be configured as schematically shown in FIG. 1. The illustrated steering system 110 extends across the wings 112 of the aircraft 111 and includes a drive unit 116 arranged in the vicinity of the middle axis A of the aircraft 111, which drives a shaft 130 extending into the wings 112. The torque from the primary shaft 130 is introduced into the steering flaps 118 by suitable torque transmission devices 120 and actuators 122.

During flight, considerable forces can act on a steering flap 118, such as a landing flap. These forces are translated into a torque input section at the actuators 122, torque transmission devices 120 and ultimately the shaft 130. To prevent the introduction of such forces or torques, various backstops have become known in the prior art.

Such backstops typically include a friction brake as a functional component in order to dissipate the introduced forces or torques into a stationary structural element of the aircraft. For example, a generic backstop that includes a friction brake is disclosed in U.S. Pat. No. 4,480,733.

Backstops that include friction brakes, however, have the disadvantage that the friction surfaces and also the associated springs can wear out over time. Furthermore, undesired heat is generated by friction, and the response behavior can be slightly delayed in part.

It is the object of the invention to provide a backstop that overcomes these disadvantages.

SUMMARY

A backstop of a torque transmission device in a steering system of an aircraft includes an input section, an output section, and a housing. The input section and the output section are portions of a drive shaft that connects the torque transmission device to a drive unit. The backstop is configured to transmit torque from the input section into the output section, but to prevent torque from the output section from being transferred back into the input section. The input section is limited from rotating coaxially relative to the output section by more than a predetermined angle. The input section stops at a first rotary position relative to the output section upon rotating in a first rotary direction. The input section stops at a second rotary position relative to the output section upon rotating in a second rotary direction that is opposite the first rotary direction. The output section is blocked from rotating in the second rotary direction while the input section is at the first rotary position and is blocked from rotating in the first rotary direction while the input section is at the second rotary position. The output section is blocked from rotating while the input section is at the second rotary position by dissipating any torque acting upon the output section into the housing.

The input section and the output section rotate coaxially relative to one another. The input section includes a cylindrical tab with a driver that protrudes radially through a window in the output section. The driver stops the input section from rotating coaxially relative to the output section at the first rotary position when the driver abuts a first side of the window. The driver stops the input section from rotating in an opposite rotary direction at the second rotary position when the driver abuts a second side of the window opposite the first side.

A backstop for a torque transmission device in a steering system of an aircraft includes an input section in the form of a first portion of a drive shaft, an output section in the form of a preferably coaxial second portion of the drive shaft, and a housing. The backstop is configured to transmit torque from the input section into the output section, but also to prevent or at least attenuate torque from the output section from being transferred to the input section by being dissipated into the housing. The input section and the output section are connected to each other such that they can be rotated against each other by a predetermined angle. Upon rotation of the input section relative to the output section in a first direction of rotation, the input section and output section take a first rotary position relative to each other, and upon rotation of the input section relative to the output section in a second direction of rotation opposite to the first direction of rotation, the input section and output section take a second rotary position relative to each other. In the first relative rotary position, the rotation of the output section in the second direction of rotation is blocked. In the second relative rotary position, the rotation of the output section directed in the first direction of rotation is blocked by the fact that a torque acting on the output section is dissipated into the housing by form fit.

Other embodiments and advantages are described in the detailed description below. This summary does not purport to define the invention. The invention is defined by the claims.

BRIEF DESCRIPTION OF THE DRAWING

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 2A:
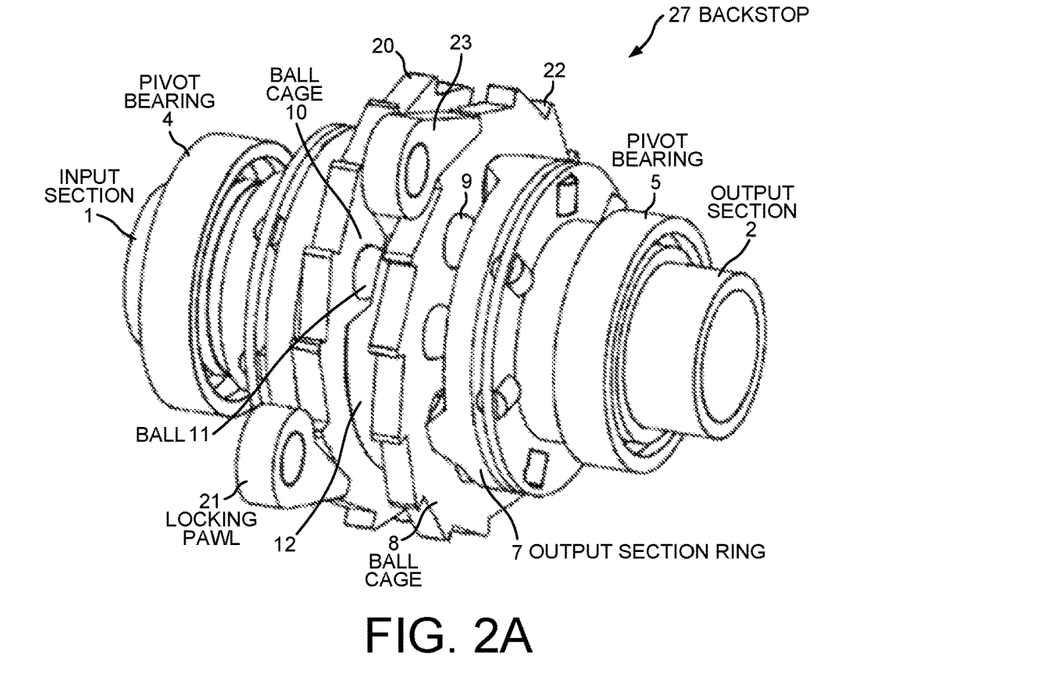
FIG. 2A is a perspective view of a backstop according to the invention.

FIG. 2A shows a novel backstop 27 of a torque transmission device 120 in a steering system 110 of an aircraft 111. In an installation condition, an input section 1 of the backstop 27 is connected to the drive unit 116, and the output section 2 is connected to a steering flap 118.

Thus, when in operation of the steering system 110 the input section 1 of a torque transmission device 120 is rotated by the drive unit 116 in a first direction of rotation and when this rotation is effected against the normal system resistance or a counter-force of the steering flap 118, the first relative rotary position is taken. On the other hand, when the input section 1 is rotated by the drive unit 116 in the second direction of rotation opposite to the first direction of rotation and when this rotation is effected against the normal system resistance or a counter-force of the steering flap 118, the second relative rotary position is taken.

By blocking a torque acting from the output section 2 of the torque transmission device 120 in a direction opposite the preceding rotation of the drive unit 116, it is achieved that when the drive unit 116 no longer is active after an activation to adjust a steering flap 118, in order to counteract a counter-torque generated by application of a force onto the steering flap 118, such a counter-torque nevertheless leads to an unwanted reverse rotation of the drive shaft 130 and hence to a reverse deflection of the steering flap 118.

In one embodiment, the input section 1 and the output section 2 are connected to each other such that upon rotation of the output section 2 relative to the input section 1 in the first direction of rotation, the input section 1 and output section 2 take the second rotary position relative to each other. Upon rotation of the output section 2 relative to the input section 1 in the second direction of rotation, the input section 1 and output section 2 take the first rotary position relative to each other.

Thus, during operation of the steering system 110 when a force acts on a steering flap 118 that leads to a torque at the output section 2 directed in the direction of the current or preceding rotation of the drive unit 116, that rotation is blocked in a manner independent of the direction, and the corresponding torque acting from the output section 2 is dissipated into the housing 28. The continued movement of the output section 2 and thus of the steering flap 118 in the same direction past the wanted deflection is prevented. Such a supporting force does not lead to an unwanted over-rotation of the drive shaft 130 and hence to an over-deflection of the steering flap 118.

A salient characteristic of the present steering system 110 is the dissipation of the supporting torques and/or counter-torques acting on the output section 2 by form fit. Compared to a non-positive dissipation in known generic devices, dissipation of torque in the present system is achieved with a low level of wear and a very precise response behavior.

The backstop 27 does not include a friction brake and preferably also no other element that is configured to dissipate a torque acting from the output section 2 into the housing 28 by force fit. Correspondingly, the backstop 27 according to the invention preferably is configured without any brake disks and without any spring elements acting on brake disks or brake pads.

The backstop 27 includes a pair of oppositely directed locking pawls 21, 23 for the purpose of the non-positive dissipation of force into the housing 28. One of the locking pawls is configured to dissipate a torque acting from the output section 2 in a first direction of rotation into the housing 28 by form fit. The other locking pawl is configured to dissipate a torque acting from the output section 2 in a second direction of rotation into the housing 28 by form fit. The locking pawls 21, 23 preferably mesh with ring-shaped locking elements which, depending on the relative rotary position of input section 1 and output section 2, can be coupled to a rotary movement of the output section 2.

At its end facing the input section 1, the output section 2 includes a sleeve-shaped receiving area into which the end of the input section 1 is inserted. The arrangement can be such that the input section 1 can in principle be freely rotated in the receiving area, but a stop means, such as driver 13 together with window 19, is provided for fixing the first and second relative rotary positions.

The inserted end of the input section 1 includes a radially protruding driver 13 that extends through a window 19 elongated in the circumferential direction in the shell of the receiving area. Opposed stop points of the driver 13 in the window 19 define the first and second relative rotary positions of the input section 1 and of the output section 2. Thus, the input section 1 and the output section 2 can be rotated against each other by a predetermined angle. When the driver 13 abuts against one end of the window 19, the first relative rotary position is reached. When the driver abuts against the other end of the window 19, the second relative rotary position is reached.

In one embodiment, the backstop 27 includes two raceway channels 16-17 circularly extending around the drive shaft 130. One of the raceway channels is formed between a ring element coupled with the output section 2 and a ring element coupled with the input section 1. The other one of the raceway channels is formed between a further ring element coupled with the output section 2 and the same ring element coupled with the input section 1.

Balls such as ball bearings can be inserted into the raceway channels 16-17.

The ring elements 6-7 or at least one edge-mounted ring element and the middle ring element 12 surround the drive shaft 130 preferably at the sleeve-shaped receiving area. The driver 13 extends beyond the aperture 19 into a receiving contour 24 of the middle ring element 12 so as to couple the rotary movements of the input section 1 and of the middle ring element 12.

In one variant, at least one of the edge-mounted ring elements can be integrally molded to the output section 2. In addition, it is possible to non-rotatably connect at least one of the edge-mounted ring elements to the output section 2 by means of a holding element such as a holding pin 26.

Balls 9, 11 are inserted into both raceway channels 16-17. At their side faces facing the raceway channels 16-17, the ring elements 6-7 include correspondingly shaped claws 18, 15 and depressions 14, 24 that are arranged offset from each other such that, in each of the two relative rotary positions of input section 1 and output section 2, one of the raceway channels is enabled for a relative movement of the balls arranged therein and of the adjacent ring elements, and the other one of the raceway channels is blocked against a relative movement of the balls arranged therein and of the adjacent ring elements. However, when a relative movement of the balls of one raceway and of the adjacent ring elements is blocked, neither the input section 1 nor the output section 2 can be rotated relative to these balls or these balls cannot circle around the drive shaft 130.

The balls 9, 11 are axially movable within the raceway channels 16-17 so as not to be blocked in their movement by the contours of the raceway channels formed by the corresponding claws and depressions in the enabled state of the raceway channels.

Each of the balls 9, 11 arranged in the raceway channels 16-17 is held in a ball cage 8, 10. The ball cages are ring-shaped and radially engage into the respective raceway channels between successive balls from outside. The coupling of the rotation of a ball cage to the rotation of the drive shaft 130 thus depends on whether or not the balls in the respective raceway can circle around the drive shaft 130 or whether or not the drive shaft 130 can be rotated relative to the balls. When they can do so, the rotation of the drive shaft 130 is decoupled from the rotation of the respective ball cage. When they cannot do so, the rotation of the drive shaft 130 is coupled to the rotation of the respective ball cage.

In one embodiment, the ball cages 10, 8 are toothed at the peripheries, and the housing 28 includes at least one corresponding locking element and a pivotable locking pawl 21, 23 per ball cage. Corresponding teeth 20, 22 and locking elements are configured such that a rotation of the respective ball cage 10, 8 is enabled in one direction and is blocked in the other direction. The enabled directions of the two ball cages are different.

Thus, the backstop 27 functions without a classical friction brake. The backstop 27 is used in an aircraft that includes a steering flap 118 and the steering system 110 that actuates the steering flap 118. The steering system 110 includes the backstop 27.

The steering system 110 includes a drive unit 116 arranged near the center line A of the aircraft. The drive unit 116 drives a shaft 130 that extends into the wings 112. The primary shaft 130 is operatively connected to the steering flap 118 by a torque transmission device 120. The steering flap 118 can be a rudder of the aircraft, such as an aileron, a landing flap or a thrust reverser flap.

Figure 2B:
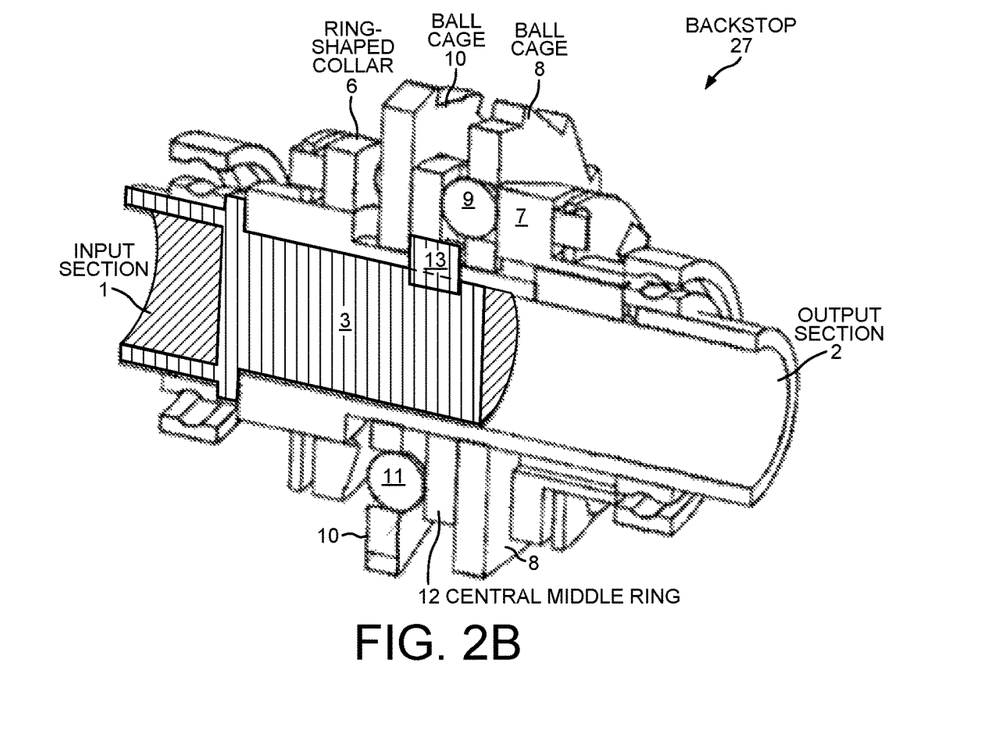
FIG. 2B is a cross sectional view of the backstop of FIG. 2A.

FIGS. 2A and 2B show a design variant of a backstop 27 according to the invention that can be located on a drive shaft 130 of a steering system 110 configured in principle as shown in FIG. 1. FIG. 2B is a cross sectional view of the backstop 27 of FIG. 2A. The backstop 27 forms part of a torque transmission device 120. The shaft 130 includes an input section 1 ultimately connected to the drive unit 116 and a coaxial output section 2 ultimately leading to a steering flap 118. The shaft 130 is guided in the housing 28 (not shown in FIG. 2) of the backstop 27 via the pivot bearings 4 and 5. To fix the relative positions of input section 1 and output section 2, the input section 1 has a cylindrical tab 3 that fits into the cavity of a sleeve-shaped receiving area of the output section 2.

In its receiving area that surrounds the cylindrical tab 3 of the input section 1, the output section 2 includes a ring element in the form of a ring-shaped collar 6 radially protruding to the outside.

Slightly more distally away from the drive unit 116, but still within the housing 28 of the backstop 27, another ring element in the form of an output section ring 7 is arranged around the output section 2. In contrast to the collar 6, the output section ring 7 is not firmly connected to the output section 2 and can freely rotate around the output section 2. The output section ring 7 is non-rotatably fixed to the output section 2 by means of a holding pin 26, as shown in FIG. 3B.

Another ring element in the form of a central middle ring 12 is dispose between the collar 6 and the output section ring 7. In contrast to the collar 6 and to the output section ring 7, the central middle ring 12 is non-rotatably fixed to the output section 2.

Two raceway channels are formed between the ring elements 6, 12 and 7. The raceway channels extend circumferentially around the drive shaft 130. A first raceway channel 16 is formed between the output section ring 7 and the middle ring 12. A second raceway channel 17 is formed between the collar 6 and the middle ring 12.

The output section 2 is also surrounded in the vicinity of the raceway channels 16 and 17 by ball cages 8 and 10. The ball cages 8 and 10 have a ring-shaped design and include structural elements radially protruding to the inside, which engage into the respective raceway channels 16-17 from the outside.

At their outer peripheries, the ball cages 10 and 8 include teeth 20, 22 that interact with corresponding locking pawls 21, 23. The locking pawls 21, 23 are attached to the housing 28 of the backstop 27 such that the ball cage 10 can rotate in the housing only clockwise (as seen from the input section 1), and the ball cage 8 can rotate in the housing only counter-clockwise. The locking pawls block any rotation in the opposite direction.

Figure 3A:
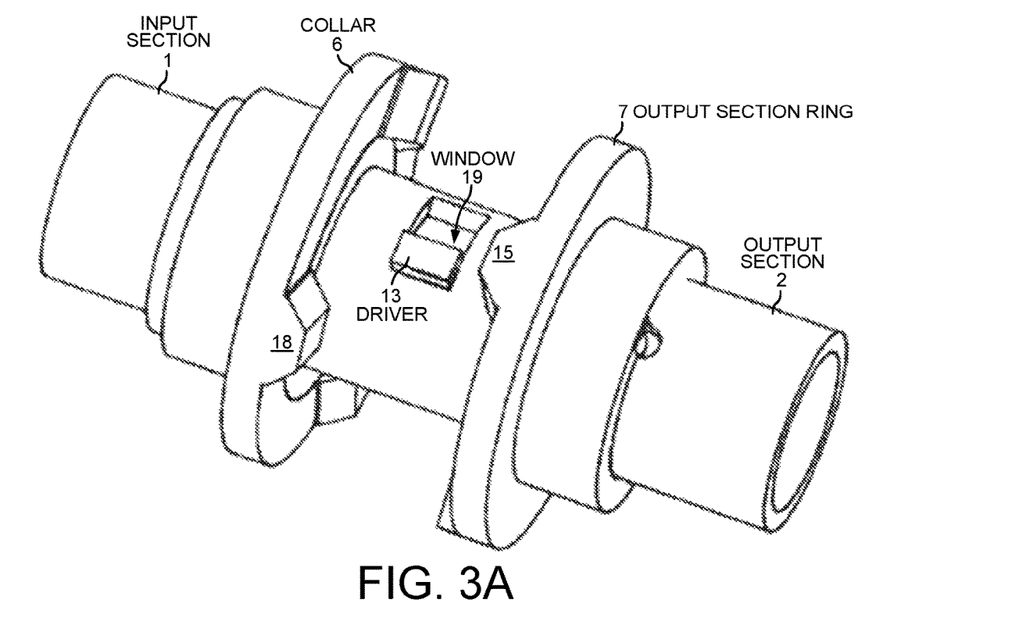
FIG. 3A is a perspective view of selected parts of the backstop of FIG. 2A.
Figure 3B:
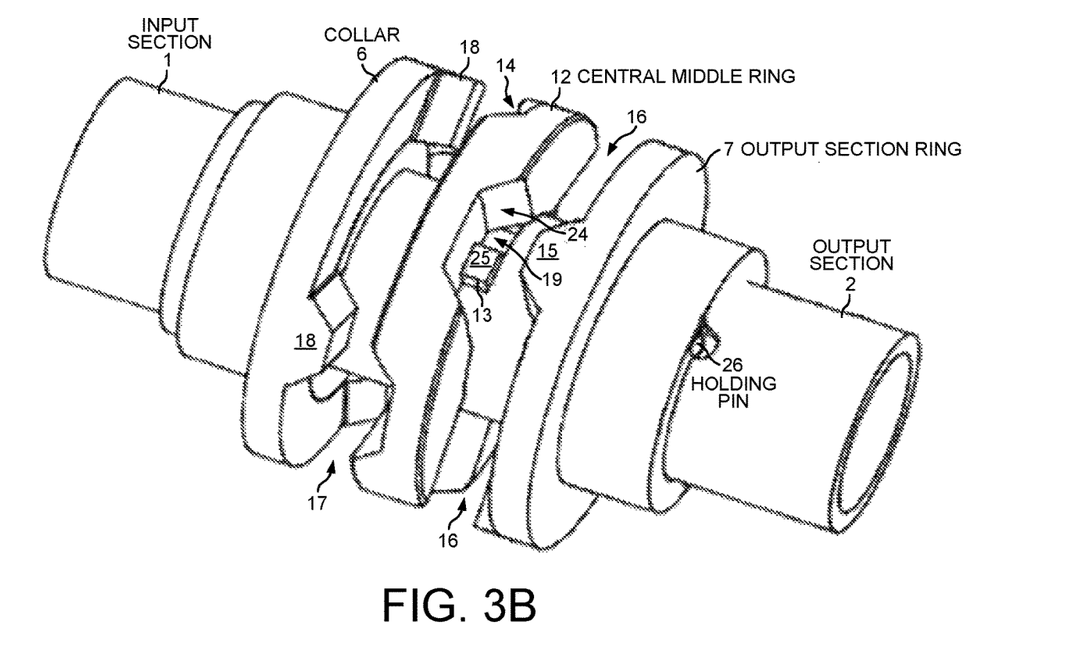
FIG. 3B is a perspective view of other selected parts of the backstop of FIG. 2A.

As shown in FIG. 3A, the collar 6 and the output section ring 7 have surface contours between them on their insides directed towards the middle ring 12 that include a plurality of claws 18, 15 directed towards the middle ring 12. The middle ring 12 is not shown in FIG. 3A in order better to illustrate the collar 6 and the output section ring 7. Each of the claws 18 and 15, includes inclined ramps on both sides of a flat plateau. As shown in FIG. 3B, the middle ring 12 includes a plurality of depressions 14, 24 on its two sides directed towards the collar 6 and towards the output section ring 7. The depressions 14, 24 are shaped to correspond to the claws 18, 15 and thus have flat bottoms from which inclined ramps extend on both sides. The raceway channels 16-17 run between the claws 15, 18 and corresponding depressions 24, 14 to form ball paths that are shaped periodically in the axial direction.

The axial position of the middle ring 12 exactly in the center between the collar 6 and the output ring 7, both of which are non-rotatably attached to the output section 2, is maintained by the balls 9 and 11 that are enclosed in the raceway channels 16 and 17. The balls 9 and 11 in turn are received in cells of the ball cages 8, 10 that are formed between successive structural elements of the ball cages 8, 10 radially engaging into the raceway channels so that a relative movement of the output section 2 and of the ball cages 8, 10 is coupled to each other via the balls 9 and 11, respectively.

In addition, the backstop 27 includes a driver 13 fixed to the tab 3 of the input section 1. The driver 13 extends through a window 19 in the shell area of the receptacle and thus couples the rotary movements of the input section 1 to those of the output section 2. The dimensions of the window 19 do not exactly correspond to the dimensions of the driver 13; with window 19 is somewhat larger than the driver 13. The window 19 has a predefined arc length in the circumferential dimension that exceeds the width of the driver 13 so that the input section 1 and the output section 2 can rotate about each other by a small angle.

The tip 25 of the driver 13 extends out of the window 19 in the radial direction and engages into one of the depressions 24 of the middle ring 12, thereby coupling the rotary movement of the middle ring 12 to the rotary movement of the input section 1. As a result, the input section 1 and the output section 2 can be rotated about each other only by the predetermined small angle. The collar 6 and the output ring 7 are non-rotatably attached to the output section 2, while the rotary position of the middle ring 12 is coupled to the rotary position of the input section 1.

Thus, in a first rotary position of the input section 1 and the output section 2 relative to each other, the raceway channels 16-17 can be open due to the opposed arrangement of the depressions 24, 14 and claws 15, 18 to the effect that the output section 2 can be rotated relative to the balls 9, 11 arranged therein. However, in a second rotary position of the input section 1 and the output section 2 relative to each other, the raceway channels 16-17 can be closed due to the offset arrangement of the depressions 24, 14 and claws 15, 18 to the effect that balls 9, 11 arranged therein cannot circle around the output section 2, or the output section 2 cannot be rotated relative to the balls 9, 11.

Figure 5A:
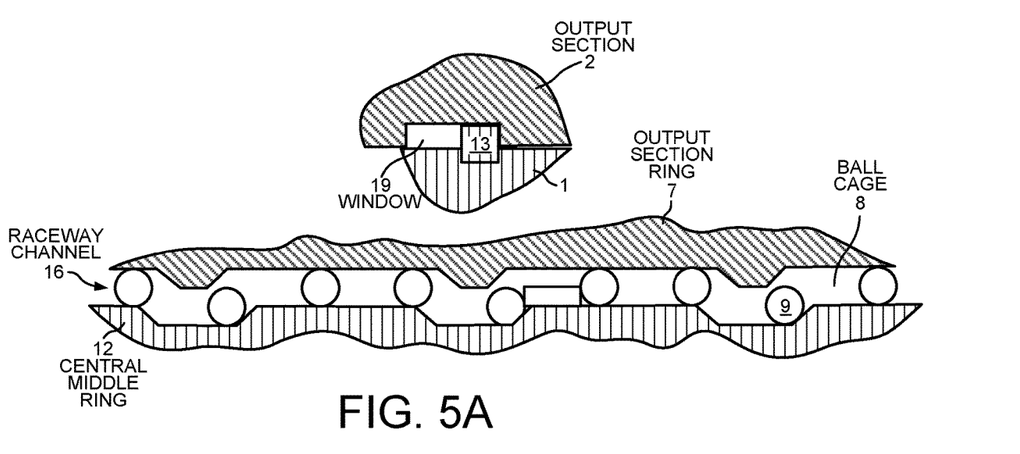
FIG. 5A is a schematic representation of a raceway of the backstop of FIG. 2A in a first state.

An open state of the raceway channel 16 is schematically shown in FIG. 5A. A closed state of the raceway channel 16 is schematically shown in the upper image of FIG. 5B.

Figure 5B:
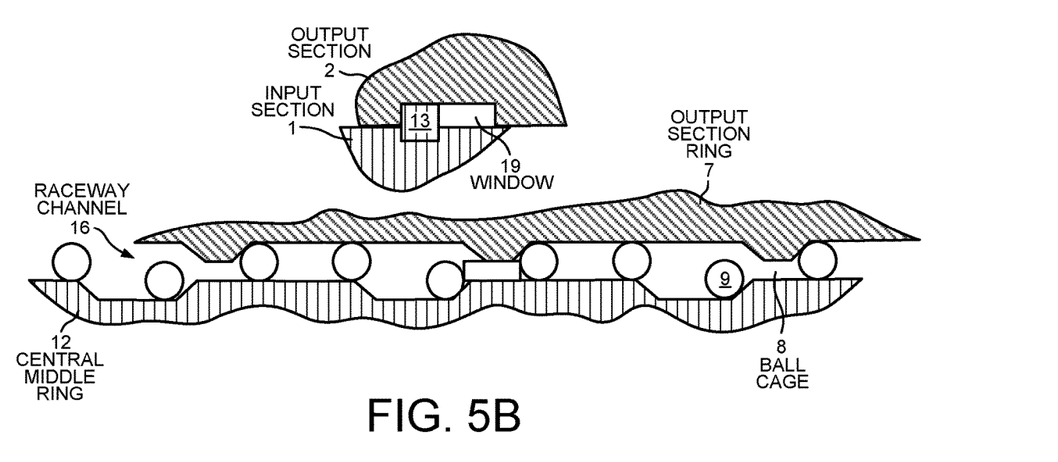
FIG. 5B is a schematic representation of a raceway of the backstop of FIG. 2A in a second state.

The claws 18, 15 and depressions 14, 24 at the collar 6, middle ring 12 and output ring 7 are each offset from the other such that both ball paths 16-17 (raceway channels) never are open or closed in the same relative rotary position of the input section 1 and the output section 2. Rather, in one relative rotary position, one of the ball paths 16-17 is open and the other one is closed, while in another relative rotary position the other one of the ball paths 16-17 is open and the first one is closed.

Thus, during operation of the steering system when the input section 1 is rotated clockwise (as seen from the input section 1) by the drive unit 116, and when this rotation is effected against the normal system resistance or a counter-force of the steering flap 118, the relative rotary position of the input section 1 and the output section 2 is such as it is shown in FIGS. 3A, 3B and 5A. Correspondingly, the raceway channel 16 is open and the output section 2 can be rotated relative to the balls 9, which leads to the fact that the movements of the input section 1 and the output section 2 on the one hand and of the ball cage 8 on the other hand are decoupled from each other. The rotary movement of input section 1 and output section 2 directed in the clockwise direction thus cannot be impeded by the fact that the ball cage 8 might be rotated in the housing 28 only counter-clockwise, but not clockwise, and the corresponding locking pawl 23 is blocked by the teeth 22.

Figure 4A:
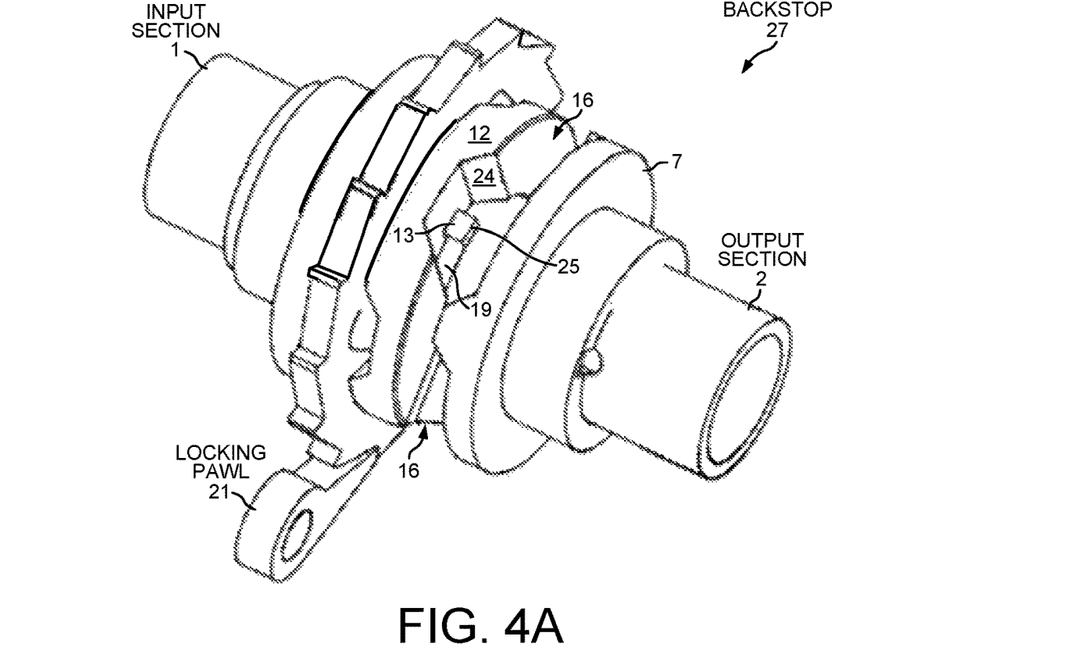
FIG. 4A is a perspective view of selected parts of the backstop of FIG. 2A in a state in which the introduction of a positive additional force onto the drive shaft is prevented.
Figure 4B:
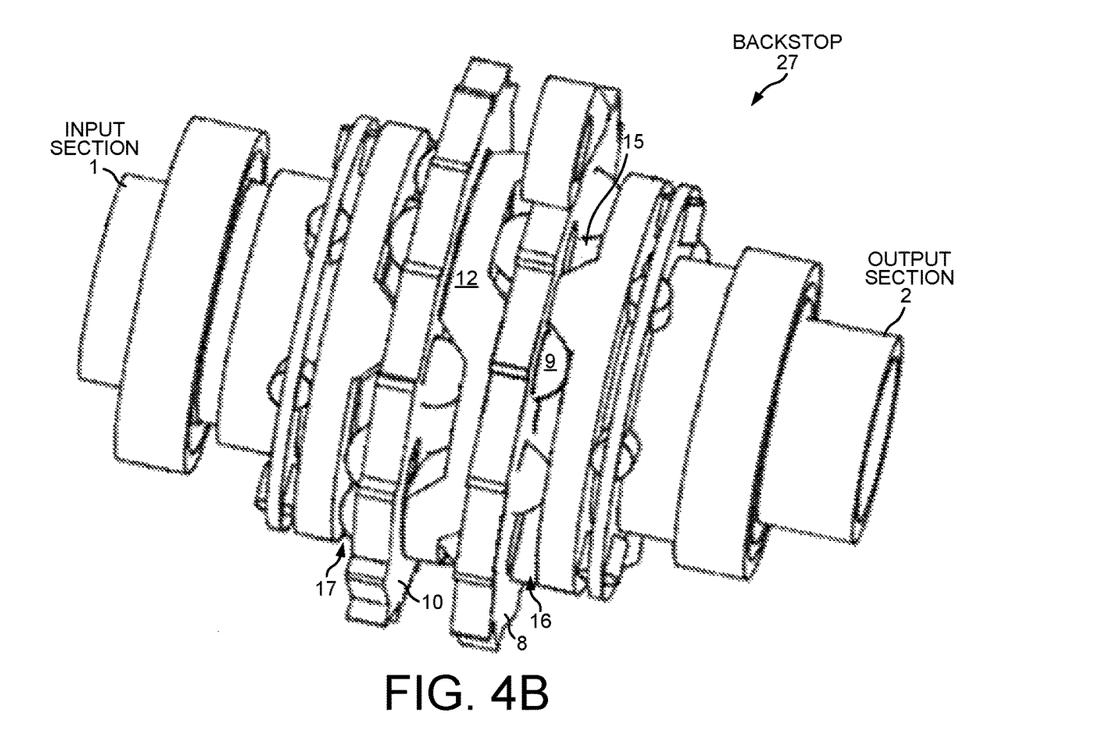
FIG. 4B is a perspective views of the complete backstop of FIG. 2A.

The description above correspondingly applies in the reverse direction of rotation. When in operation of the steering system 110 the input section 1 is rotated counter-clockwise by the drive unit 116, and when this rotation is effected against the normal system resistance or a counter-force of the steering flap 118, the relative rotary position of the input section 1 and the output section 2 is such as it is shown in FIGS. 4A, 4B and 5B.

Correspondingly, the raceway channel 17 (FIG. 4B) is open and the output section 2 can be rotated relative to the balls 11, which leads to the fact that the movements of the input section 1 and the output section 2 on the one hand and of the ball cage 10 on the other hand are de-coupled from each other. The rotary movement of input section 1 and output section 2 directed in the counter-clockwise direction thus cannot be impeded by the fact that the ball cage 10 might be rotated in the housing 28 only clockwise, but not counter-clockwise because the corresponding locking pawl 21 would block the teeth 20.

However, when due to the action of a force at the steering flap 118 a torque acts on the output section 2, either clockwise or counter-clockwise, a rotation of the input section 1 and the output section 2 is inhibited.

Concretely, a counter-clockwise torque at the output section 2 leads to an adjustment of the relative rotary position of the input section 1 and the output section 2 such as it is shown in FIGS. 3A, 3B and 5A.

Correspondingly, the raceway channel 17 is closed and the output section 2 cannot be rotated relative to the balls 11, which leads to the fact that the counter-clockwise rotary movement of the output section 2 is coupled to the rotary movement of the ball cage 10 directed in the same direction. As the ball cage 10 might only be rotated clock-wise in the housing 28, but not counter-clockwise, the undesired rotation of the output section 2 in this case is inhibited by action of a force at the steering flap 18. The force rather is dissipated into the housing 28 of the backstop 27 via the ball cage 10 and the corresponding locking pawl 21.

A clockwise torque at the output section 2 leads to an adjustment of the relative rotary position of the input section 1 and the output section 2 such as it is shown in FIGS. 4A, 4B and 5B. Correspondingly, the raceway channel 16 is closed and the output section 2 cannot be rotated relative to the balls 9, which leads to the fact that the clockwise rotary movement of the output section 2 is coupled to the rotary movement of the ball cage 8 directed in the same direction. As the ball cage 8 might be rotated in the housing 28 only counter-clockwise, but not clockwise, the undesired rotation of the output section 2 in this case is also inhibited by action of a force at the steering flap 118. The force is dissipated into the housing 28 of the backstop 27 via the ball cage 8 and the corresponding locking pawl 23.

In a similar manner, the output section 2 also is prevented from running ahead of the input section 1 due to the occurrence of a supporting force acting at the steering flap 118 in the current direction of actuation.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A backstop of a torque transmission device, comprising:
   an input section;
   an output section, wherein the input section and the output section are portions of a drive shaft, and wherein the input section is limited from rotating coaxially relative to the output section by more than a predetermined angle; and
   a housing, wherein the input section stops at a first rotary position relative to the output section upon rotating in a first rotary direction, wherein the input section stops at a second rotary position relative to the output section upon rotating in a second rotary direction that is opposite the first rotary direction, wherein the output section is blocked from rotating in the second rotary direction while the input section is at the first rotary position relative to the output section, wherein the output section is blocked from rotating in the first rotary direction while the input section is at the second rotary position relative to the output section, and wherein the output section is blocked from rotating while the input section is at the second rotary position by dissipating any torque acting upon the output section into the housing.

2. The backstop of claim 1, wherein the input section is connected to the output section such that when the output section rotates in the first rotary direction the output section stops at a second rotary position relative to the input section and such that when the output section rotates in the second rotary direction the output section stops at a first rotary position relative to the input section.

3. The backstop of claim 1, wherein the backstop does not include a friction brake, a brake disk or a brake pad.

4. The backstop of claim 1, further comprising:
a first locking pawl; and
a second locking pawl, wherein the first locking pawl is configured to dissipate a first torque acting on the output section in the first rotary direction into the housing, and wherein the second locking pawl is configured to dissipate a second torque acting on the output section in the second rotary direction into the housing.

5. The backstop of claim 1, wherein the input section includes a cylindrical tab that fits into the output section, wherein the cylindrical tab includes a radially protruding driver that extends through a window in the output section, wherein the input section stops at the first rotary position upon rotating in the first rotary direction when the driver abuts a first side of the window, and wherein the input section stops at the second rotary position upon rotating in the second rotary direction when the driver abuts a second side of the window opposite the first side.

6. The backstop of claim 1, further comprising:
a ring-shaped collar fixedly attached to the output section;
an output section ring attached to the output section and disposed farther away from the input section than is the ring-shaped collar;
a middle ring disposed between the ring-shaped collar and the output section ring;
a first raceway channel formed between the output section ring and the middle ring; and
a second raceway channel formed between the middle ring and the ring-shaped collar.

7. The backstop of claim 6, wherein the ring-shaped collar and the output section ring include claws that are arranged opposite depressions in the middle ring.

8. The backstop of claim 6, further comprising:
balls disposed in the first raceway channel and in the second raceway channel, wherein in the first rotary position the balls are blocked from moving in the second raceway channel and can move in the first raceway channel, and wherein in the second rotary position the balls are blocked from moving in the first raceway channel and can move in the second raceway channel.

9. The backstop of claim 6, further comprising:
balls disposed in the first raceway channel and in the second raceway channel;
a first ball cage, wherein balls are held by the first ball cage in the first raceway channel;
a second ball cage, wherein balls are held in the second ball cage in the second raceway channel, and wherein each of the first ball cage and the second ball cage has teeth at its periphery;
a first locking pawl pivotally attached to the housing; and
a second locking pawl pivotally attached to the housing, wherein the first locking pawl interacts with the teeth of the first ball cage to permit the first ball cage to rotate in only one rotary direction, and wherein the second locking pawl interacts with the teeth of the second ball cage to permit the second ball cage to rotate in only an opposite rotary direction.

10. The backstop of claim 1, wherein the backstop is disposed in an aircraft.

11. A backstop, comprising:
an input section of a drive shaft that connects a torque transmission device to a drive unit; and
an output section of the drive shaft, wherein the input section includes a cylindrical tab that fits into the output section, wherein the input section and the output section rotate coaxially relative to one another, wherein the cylindrical tab includes a driver that protrudes radially through a window in the output section, wherein the driver stops the input section from rotating coaxially relative to the output section at a first rotary position when the driver abuts a first side of the window, and wherein the driver stops the input section from rotating in an opposite rotary direction at a second rotary position when the driver abuts a second side of the window opposite the first side.

12. The backstop of claim 11, further comprising:
a housing; and
a locking pawl configured to dissipate a torque acting on the output section into the housing.

13. The backstop of claim 11, wherein the backstop does not include a friction brake.

14. The backstop of claim 11, wherein the driver stops the input section from rotating coaxially relative to the output section by more than a predetermined angle.

15. The backstop of claim 11, further comprising:
a ring-shaped collar fixedly attached to the output section;
an output section ring attached to the output section and disposed farther away from the input section than is the ring-shaped collar;
a middle ring disposed between the ring-shaped collar and the output section ring;
a first raceway channel formed between the output section ring and the middle ring; and
a second raceway channel formed between the middle ring and the ring-shaped collar.

16. The backstop of claim 15, further comprising:
ball bearings disposed in the first raceway channel and in the second raceway channel;
a first ball cage, wherein the ball bearings are held by the first ball cage in the first raceway channel;
a second ball cage, wherein the ball bearings are held in the second ball cage in the second raceway channel, and wherein each of the first ball cage and the second ball cage has teeth at its periphery;
a first locking pawl that interacts with the teeth of the first ball cage to permit the first ball cage to rotate in only a first rotary direction; and
a second locking pawl that interacts with the teeth of the second ball cage to permit the second ball cage to rotate in only a rotary direction opposite the first rotary direction.

17. The backstop of claim 15, wherein the ring-shaped collar and the output section ring include claws that are arranged opposite depressions in the middle ring.

18. The backstop of claim 15, further comprising:
balls disposed in the first raceway channel and in the second raceway channel, wherein in the first rotary position the balls are blocked from moving in the second raceway channel and can move in the first raceway channel, and wherein in the second rotary position the balls are blocked from moving in the first raceway channel and can move in the second raceway channel.

19. The backstop of claim 11, wherein the backstop is disposed in an aircraft, and wherein the drive unit drives a flap.

* * * * *